United States Patent [19]
Wright et al.

[11] 3,885,782
[45] May 27, 1975

[54] SHEET FEEDER

[75] Inventors: David D. Wright, Vershire, Vt.; Ivor Hawkes, Lyme, N.H.

[73] Assignee: Xerox Corporation, Stamford, Conn.

[22] Filed: Dec. 6, 1973

[21] Appl. No.: 422,385

[52] U.S. Cl. ................. 271/10; 271/110; 271/122
[51] Int. Cl. ............................................. B65h 3/52
[58] Field of Search ......... 271/125, 122, 10, 4, 114, 271/116, 110, 111, 34, 35

[56] References Cited
UNITED STATES PATENTS

| | | | |
|---|---|---|---|
| 2,257,843 | 10/1941 | Payne | 271/122 X |
| 3,127,166 | 3/1964 | Fawdry | 271/122 X |
| 3,545,742 | 12/1970 | Muller et al. | 271/10 |
| 3,556,512 | 1/1971 | Fackler | 271/4 |

*Primary Examiner*—Evon C. Blunk
*Assistant Examiner*—Bruce H. Stoner, Jr.

[57] ABSTRACT

An automatic document handler for supplying documents singly from a supply tray to the platen of a processing apparatus such as a copying machine. Documents are separated from the document supply and transported to a multiple document rejecting mechanism where excess documents are driven back toward the document tray, the rejecting mechanism being subsequently retracted from the document path to minimize the drag force on the document being forwarded and provide a more positive forward drive force thereon.

2 Claims, 3 Drawing Figures

SHEET FEEDER

BACKGROUND OF THE INVENTION

In many applications, it is necessary to feed single sheets of paper from a paper supply in rapid sequence. For example, in order to more fully utilize the high speed copying capabilities of modern reproduction machines, it is desirable to employ an automatic document handler for placing original documents to be copied on the platen of the reproduction machine and removing them therefrom to minimize the necessity for operator involvement with the reproduction machine. To accomplish this, the document handling device first must separate the document to be copied from others awaiting copying. Following this, the document is forwarded to the machine platen, properly located thereon, copied and removed to enable succeeding copies to be placed on the platen.

In this process, the document to be copied must be rapidly separated from the stack of documents in the document supply tray, multiply fed documents must be separated from the desired document and returned to the document tray, the single document must be forwarded to the platen and located thereon, and after copying, removed therefrom. This entire procedure must be accomplished rapidly to remove the copied document and place the succeeding document on the platen preferably between copy cycles of the machine. In high speed machines capable of producing more than one copy a second, this may not be possible. However, it may be possible to accomplish the document feed at a speed whereby only one image frame or one print cycle is missed. In other words, the removal of one document and placement of the succeeding documents may be accomplished in less than 1 second. At these speeds, rapid acceleration and positive feeding of the documents is imperative. However, the document handler must also be designed to produce minimal wear and tear on the documents, prevent misfeeds or multifeeds, and minimize jams to prevent damage to the documents which may be irreplaceable.

In attempting to design an automatic handler which will provide minimal wear and tear on the documents while assuring positive feeding thereof, prevent misfeeds or multifeeds, and minimize jams in the document handler, a number of problems may be encountered. The first of these relates to the positive separation of a single document from a stack of documents for forwarding the document to the platen of the copying machine. In attempting to separate a single document from the stack, a number of adjacent documents may adhere thereto and be fed along with the desired document. A retard assembly may therefore be utilized to return the excess documents to the stack. One of the most positive retard systems employs a pair of cooperating rollers, one of which is positively driven in the feed direction. The other roll, commonly called the retard roll, may be driven in the opposite direction through a slip clutch or similar device. When there are no documents presented between the rolls, frictional engagement therebetween provides sufficient torque on the retard roll to cause the clutch to slip and allow the retard roll to rotate in the feed direction. The same effect is obtained when there is but one sheet between the rolls, i.e., the frictional engagement between the positively driven roll and the paper, and between the opposite side of the paper and the retard roll, causes the retard roll clutch to slip and allow the retard roll to rotate in the feed direction. However, if more than one document or sheet of paper is presented between the two rolls, the frictional force between the multiple sheets is insufficient to drive the retard roll in the feed direction. The retard roll thus rotates in the opposite direction and returns all of the excess sheets or documents to the document stack.

However, even though this arrangement minimizes the possibility of multi-feeds, the retard roll presents a drag on the fed sheet which may require the feed rolls or subsequent sheet forwarding devices to exert undesirable forces on the document to assure positive feeding thereof.

Further, a condition may be encountered wherein due to the high speed of the document being forwarded, even though excess documents may be somewhat retarded by the retard roll, the retard effect may not be sufficient to completely clear the excess documents from contact with the document being fed, thereby allowing them to be fed into downstream feed rolls which may be capable of exerting sufficient forward feed force on the excess documents to overcome the retard effect of the retard mechanism.

SUMMARY OF THE INVENTION

This invention relates to a sheet feeding mechanism employing a retard roll, acting in conjunction with a positively driven feed roll to feed a single document to the platen of a copy machine while rejecting multiply fed documents. When the fed document is positioned between the feed roll and the retard roll, the feed roll may be momentarily de-energized to allow time for the retard roll to drive excess documents back toward the sheet stack. Following the momentary deenergization of the feed roll, the retard roll is adapted for movement out of cooperative engagement with the feed roll at the same time that a feed shoe is moved into cooperative engagement with the feed roll for positive, rapid feeding of the document to the platen while minimizing the force exerted on the document.

DESCRIPTION OF THE PREFERRED EMBODIMENT

Figure 1:
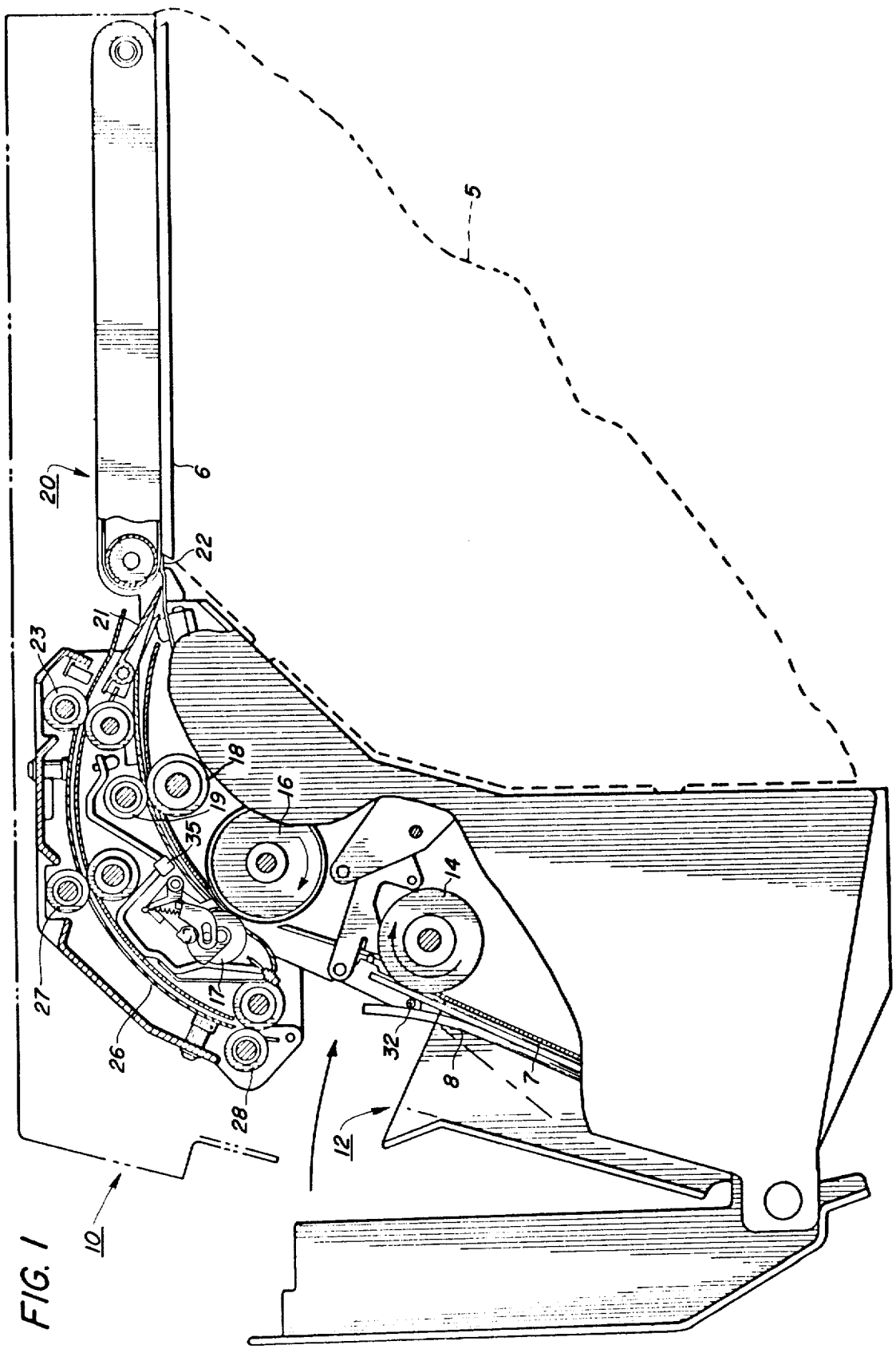
FIG. 1 is a side view in cross-section showing a document handler incorporating the improved retard roll assembly of the present invention in operative association with a document reproduction machine.

Referring to the drawings, there is shown a document handler designated generally by the numeral 10 incorporating the retard roll-feed shoe mechanism of the present invention. To document handler 10 may be used with any suitable document processing apparatus, such as a reproduction machine 5 which is provided with a platen 6 on which the document to be copied is placed.

Document handling apparatus 10 includes a supply tray 12 for storing both documents 7 to be copied and documents 8 which have been copied. From tray 12, one or more documents are advanced from the bottom of supply 7 by an intermittently operated primary feed roll 14 into the nip of retard roll pair 16, 17. The lower roll 16 is driven in a document feeding direction (as shown by the arrow in FIG. 1) while the upper roll 17 is driven in the reverse or document reject direction by a suitable slip coupling (not shown).

Frictional engagement between roll 16 and roll 17 normally provides sufficient driving force on roll 17 to override the drive input to roll 17 (i.e., the coupling slips) and thereby allows roll 16 to turn roll 17 in the document feeding direction.

When a single document is fed between rolls 16, 17, frictional engagement of roll 16 with one side of the document and the corresponding frictional engagement of roll 17 with the opposite side of the document is also sufficient to drive roll 17 in the document feed direction.

However, should more than one document be presented between roll pair 16, 17, the frictional engagement between roll 16 and the undersurface of the bottom document and between roll 17 and the upper surface of the top document will be greater than the frictional engagement between the multiple documents. Under these circumstances, the slip clutch driving roll 17 will not slip and roll 17 will be rotated in a document rejection direction to return the excess documents to the tray.

The document emerging from retard roll pair 16, 17 passes into the nip of intermediate roll pair 18, 19 and from there underneath deflector plate 21 to platen transport 20. Transport 20, which preferably comprises a belt type conveyor, first carries the document forward onto platen 6 until the entire document is positioned thereon. Transport 20 is then reversed to bring the document trailing edge against register 22. Register 22 locates the document in copying position following which the copy or copies are made by the reproduction apparatus 5.

When copying is completed, platen transport 20 is again started in reverse to move the document backwards off platen 6, register edge being previously retracted for this purpose. Deflector 21, which was previously lowered, guides the returning document upwardly into the nip of return roll pair 23. Roll pair 23 moves the document along suitable return guides 26 through second and third return roll pairs 27, 28 respectively and back into tray 12.

To maintain copied documents which have been designated for convenience by the numeral 8, segregated from the documents 7 awaiting copying and prevent inadvertent or premature refeeding of the returned documents 8 by feed roll 14 following feeding of the last one of the documents 7, a displaceable bail or separator bar 32 is provided. Bail 32 is disposed substantially opposite to and above primary feed roll 14 to prevent documents resting thereon from contacting roll 14. The bail 32 is biased against primary feed roll 14 by suitable springs to force the documents being fed against roll 14 and provide frictional engagement between roll 14 and the document resting thereagainst for positive feeding of the document by the roll 14. As stated heretofore, in the event that more than one document is carried up toward the separator roll pair 16, 17 due to the frictional force between the lower-most document and the document lying thereagainst, the retard roll 17 will operate in reverse to drive the excess documents back into the tray. For a more complete description of an automatic document handler of the type illustrated, reference may be had to U.S. Pat. No. 3,829,082 granted Aug. 13, 1974 in the name of August Hoyer.

Figure 2:
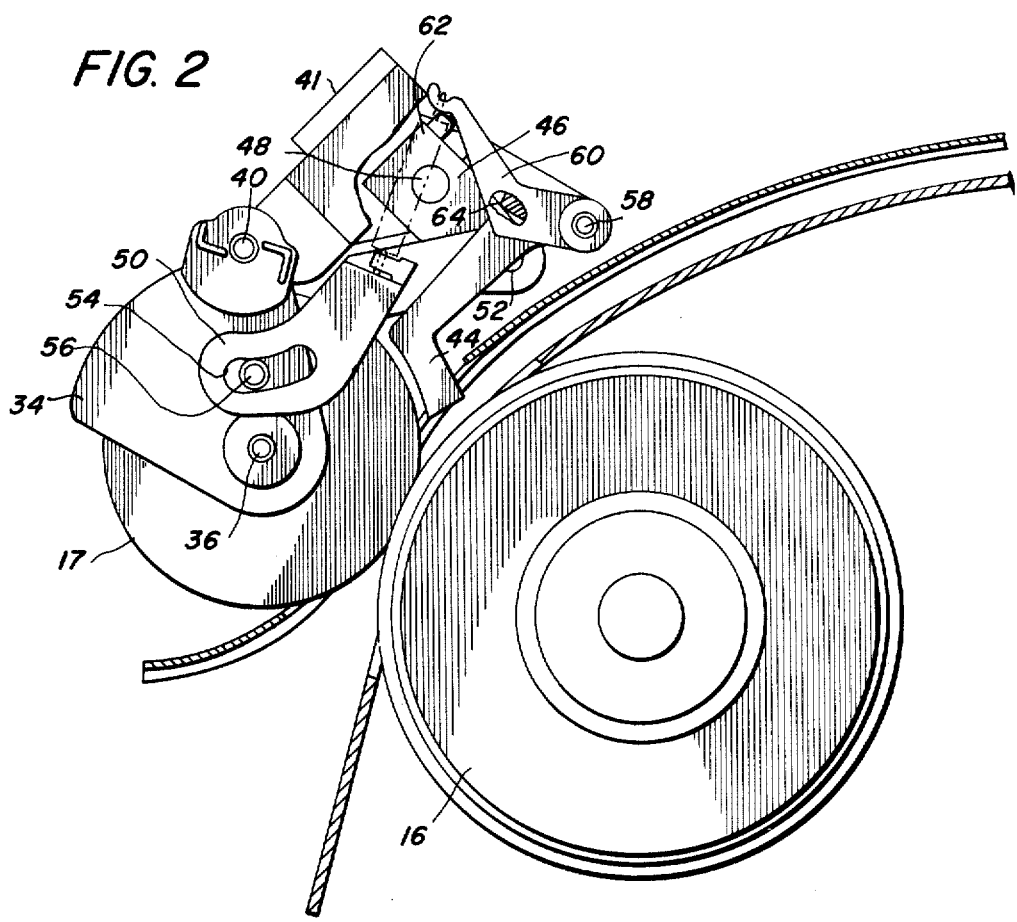
FIG. 2 is an enlarged side view of the retard roll-feed shoe mechanism utilized in the document handler of FIG. 1.
Figure 3:
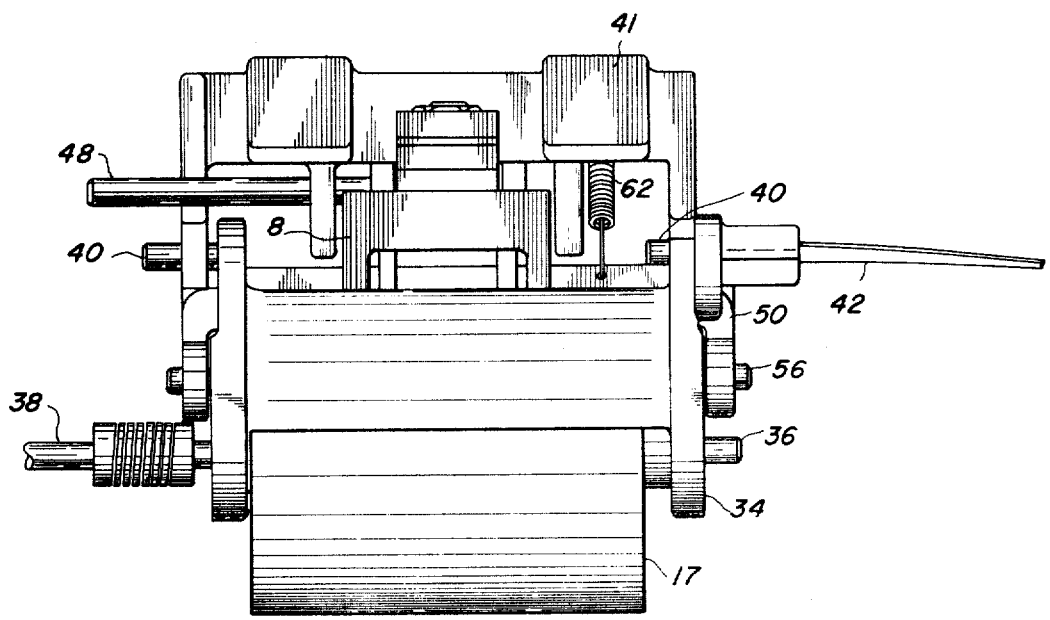
FIG. 3 is an end view of the retard roll-feed shoe arrangement of FIG. 2.

Referring to FIGS. 2 and 3 wherein the retard mechanism is more clearly illustrated, it can be seen that the retard roll 17 is mounted for rotation in a saddle 34. Shaft 36, which is secured to roll 17, is mounted in saddle 34 for rotation relative thereto. A flexible drive shaft 38 and slip clutch (not shown) are provided to drive roll 17 in a document reject direction when plural documents are presented between rolls 16 and 17, the slip clutch allowing roll 17 to rotate in the document feed direction when a single document is present between rolls 16, 17 as explained heretofore.

Saddle 34 is pivotally mounted on a shaft 40 which in turn is secured to stationary frame portion 41 of the automatic document handler. The saddle 34 is biased by torsion spring 42 in a counterclockwise direction as viewed in FIG. 2 to force roll 17 into driving engagement with roll 16.

Upon energization of the device to feed a document from the stack to the platen, once the document is presented between rolls 16, 17 and the presence thereof sensed by a suitable paper sensor 35, roll 16 may be de-energized momentarily to allow time for roll 17 to drive multiply fed documents back toward the tray 12. After the momentary delay, the roll 17 is pivoted out of operative engagement with roll 16 to minimize the drag force on the document being fed by roll 16. To assure positive feeding of the document by roll 16 as roll 17 is pivoted therefrom, a feed shoe 44 is pivoted against roll 16 to hold the document in frictional engagement with roll 16. Shoe 44 may be provided with a low friction surface by polishing or by the use of a suitable non-stick coating such as polytetrafluoroethylene.

The feed shoe not only provides for positive feeding of the proper document by roll 16 but also acts as a barrier to prevent the trailing edge of the document being fed from thereafter carrying rejected documents, which may not have settled completely into the tray 12, towards the platen. Thus the shoe prevents the possibility of multi-feeds when the retard roll 17 is out of engagement with roll 16.

To provide the requisite pivotal movement of roll 17 and shoe 44, an actuator arm 46, secured to a rotatable shaft 48, is connected to saddle 34 by means of a slotted arm 50. One end of arm 50 is pivotally connected to actuator arm 46 by pivot pin 52, the other end being provided with an arcuate slot 54 for engagement with a pin 56 secured to saddle 34.

Shoe 44 is pivotally mounted on frame portion 41 by means of pivot shaft 58 for pivotal movement toward and away from roll 16. A feed shoe actuator arm 60, pivotally mounted on shaft 58 is secured to feed shoe 44 for rotation therewith about shaft 58. Arm 60 is connected to slotted arm 50 by means of a spring 62.

Considering the operation of the retard roll lift mechanism, upon rotation of shaft 48 in a clockwise direction as viewed in FIG. 2 by suitable means such as a rotary solenoid (not shown), arm 50 will be moved to the left until the end of slot 54 contacts pin 56 whereupon further movement of arm 50 causes saddle 34 to rotate about shaft 40 and lift roll 17 out of engagement with roll 16. At the same time, movement of arm 50 through spring 62 causes rotation of arm 60 and feed shoe 44 attached thereto in a counterclockwise direction to force shoe 44 against roll 16 to provide the required normal force against the document for feeding of the document by roll 16. The biasing force exerted on shoe 44 by spring 62 may be minimal since the drag force normally exerted on the document is removed when the roll 17 is pivoted out of contact with the document. The minimal forces necessary to drive the document toward the platen after roll 17 is disengaged therefrom greatly reduce wear and tear on the document and reduce the danger of damage to the document.

After the fed sheet has cleared the feed roll 16, the retard roll 17 may again be lowered into contact therewith. Upon de-energization of the rotary solenoid, torsion spring 42 will force saddle 34 in a counterclockwise direction to move the roll 17 into contact with the roll 16. As the solenoid returns to its inactivated position, arm 46 will be rotated in a counterclockwise direction as viewed in FIG. 2. A cam surface 64 provided on arm 60 will contact arm 46 and cause the arm 60 and shoe 44 to be cammed away from roll 16 into the position illustrated in FIG. 2.

The rotary solenoid may be actuated in response to a signal from a photodetector 35 which senses the presence of the lead edge of the document being fed. As stated heretofore, to assure return of multiply fed documents back toward the supply tray, when the lead edge of the sheet being fed is sensed by photocell 35, the feed roll 16 is stopped for a fraction of a second to provide sufficient time for retard roll 17 to drive the excess sheets in the reverse direction. After this preselected time interval, the roll 16 is again activated at the same time that roll 17 is pivoted away from the roll 16 and shoe 44 is brought into contact therewith. After the document being fed is clear of the roll 16, roll 17 may be pivoted back into contact therewith in preparation for the succeeding document feed cycle.

The described retard roll-feed shoe arrangement provides a dramatic improvement in the rejection of multiply fed documents and greatly reduces wear and tear on the documents being fed.

While we have described a preferred embodiment of our invention, it should be understood that the invention is not limited thereto but may be otherwise embodied within the scope of the following claims:

What is claimed is:

1. In an apparatus for separating and feeding individual sheets of material from a stack of sheet material including separator means adapted for engagement with one sheet in the stack to separate the sheet from the stack, feed means adjacent said separator means for engaging and feeding the separated sheets away from the stack, a retard roll adapted for cooperation with said feed means, drive means adapted to rotate said retard roll in a direction to return excess separated sheets to the stack of sheet material; and slip means associated with said drive means and said retard roll adapted to allow said retard roll to rotate in a feed direction when a single sheet is present between said retard roll and said feed means, the improvement comprising:

sheet sensing means adapted to sense the presence of a sheet between said feed means and said retard roll, said sheet sensing means being adapted to momentarily de-energize said feed means to allow time for said retard roll to return excess separated sheets to the stack; and, lift means adapted to move said retard roll out of engagement with said feed means after the excess sheets have been cleared from between said retard roll and said feed means to remove the drag on the sheet being forwarded by said feed means.

2. Apparatus according to claim 1 further including a feed shoe adapted for engagement with said feed means, said shoe being movable into engagement with the sheet material when said retard roll is moved out of engagement therewith, said feed shoe forcing the sheet being fed against said feed means to assure positive feeding thereof and blocking passage of excess separated sheets between said feed means and said shoe.

* * * * *